United States Patent Office.

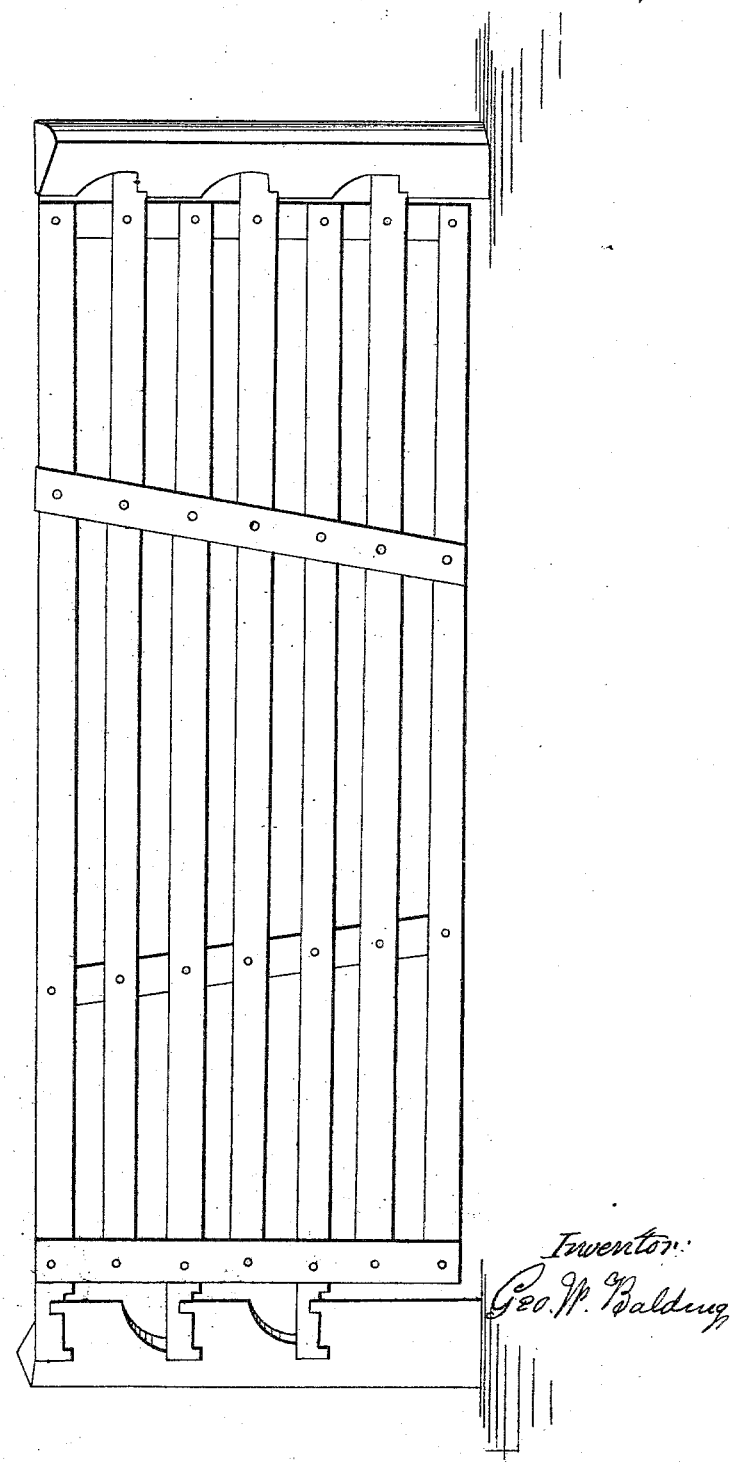

GATES AND GATE POSTS.

GEORGE W. BALDING, OF PLEASANT, INDIANA.

Letters Patent No. 59,753, dated November 20, 1866.

---

SPECIFICATION.

TO ALL WHOM IT MAY CONCERN:

Be it known that I, GEORGE W. BALDING, of Pleasant, in the county of Steuben, in the State of Indiana, have invented a new and improved gate and gate posts.

And I do hereby declare that the following is a full and exact description thereof, reference being had to the accompanying drawings:

1. The nature of my invention consists in extending alternately the ends of the boards or horizontal bars, so that they may form sufficient bearings to support the gate at both ends, with or without notches in the boards, as shown in the accompanying drawings.

2. The form of the posts to be such as shown in the accompanying drawings, and better shown in the accompanying drawings, and described as follow:s, viz:

Both posts to be in form with an angle so acute at one corner that they can be notched to receive the alternate projections of the ends of the gate; and admit the gate to turn in said notches, so it can be opened either way at right angles from the standing line, when shut; that is, so that one end may be carried in one direction, or the other end in the opposite direction.

3. I also claim the invention of the form of the notches in the posts; being an open hooked notch, with square or smooth bottom, so that the gate bearings can turn in them, as necessary to open the gate as aforesaid, into which it is secured by a loosely fitting pin; reference being had to the said drawings.

4. Further, I do not confine my invention to any limited number of bearings or notches in the posts, but to the nature and principle of the aforesaid inventions.

GEO. W. BALDING.

Witnesses:
L. A. HENDRY,
A. W. HENDRY.